(12) United States Patent
Nozoe et al.

(10) Patent No.: US 10,414,455 B2
(45) Date of Patent: Sep. 17, 2019

(54) STRADDLE VEHICLE

(71) Applicant: HONDA MOTOR CO., LTD., Tokyo (JP)

(72) Inventors: Koichi Nozoe, Saitama (JP); Yutaka Kikuchi, Saitama (JP); Hiroaki Shibuya, Saitama (JP); Katsuhisa Yamada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/072,667

(22) PCT Filed: Feb. 5, 2016

(86) PCT No.: PCT/JP2016/053585
§ 371 (c)(1),
(2) Date: Jul. 25, 2018

(87) PCT Pub. No.: WO2017/134833
PCT Pub. Date: Aug. 10, 2017

(65) Prior Publication Data
US 2019/0031267 A1    Jan. 31, 2019

(51) Int. Cl.
*B62J 9/00* (2006.01)
*B62H 5/00* (2006.01)
*H01Q 1/32* (2006.01)
*B62J 1/28* (2006.01)

(52) U.S. Cl.
CPC ............... *B62J 9/001* (2013.01); *B62H 5/00* (2013.01); *H01Q 1/3291* (2013.01); *B62J 1/28* (2013.01)

(58) Field of Classification Search
CPC ..... B62J 9/00; B62J 9/001; B62J 9/003; B62J 9/005; B62J 9/006; B62J 9/008; B62J 9/02; B62H 5/00; H01Q 1/3291
See application file for complete search history.

(56) References Cited

U.S. PATENT DOCUMENTS

| 4,163,513 A | 8/1979 | Kramer |
| 8,925,778 B1 | 1/2015 | Gordon |
| 2005/0092797 A1 | 5/2005 | Takahashi et al. |

(Continued)

FOREIGN PATENT DOCUMENTS

| JP | 2005-096546 A | 4/2005 |
| JP | 2006-126169 A | 5/2006 |
| JP | 2012-030612 A | 2/2012 |

OTHER PUBLICATIONS

Apr. 26, 2016, International Search Report issued for related PCT application No. PCT/JP2016/053585.

(Continued)

*Primary Examiner* — Justin M Larson
(74) *Attorney, Agent, or Firm* — Paratus Law Group, PLLC

(57) ABSTRACT

A straddle vehicle includes: a body frame; an article storage portion including a case portion which is supported by the body frame and opens in a vehicle width direction and a lid portion attached to the case portion so as to be openable and closable and having a storage space; a lock unit for locking the lid portion to the case portion; and an antenna unit for receiving radio waves. A tray member is provided in an upper portion of the case portion in the storage space of the article storage portion, and the lock unit and the antenna unit are accommodated in the tray member.

4 Claims, 15 Drawing Sheets

(56) References Cited

U.S. PATENT DOCUMENTS

2007/0247377 A1  10/2007  Funayose
2012/0025961 A1   2/2012  Hojo et al.
2016/0052581 A1   2/2016  Seo et al.

OTHER PUBLICATIONS

Apr. 26, 2016, International Search Opinion issued for related PCT application No. PCT/JP2016/053585.
Sep. 29, 2017, Taiwanese Office Action issued for related TW application No. 106103703.
Jan. 3, 2019, European Search Report issued for related EP Application No. 16889318.8.

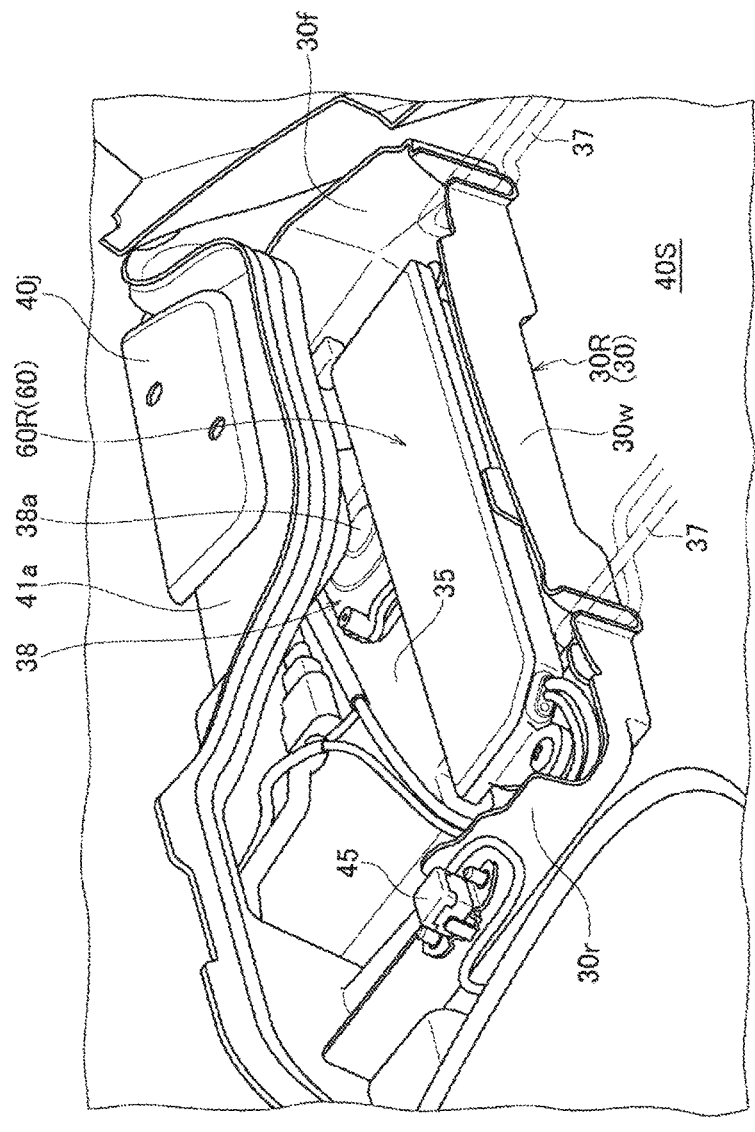
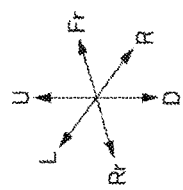
FIG.12

STRADDLE VEHICLE

CROSS REFERENCE TO PRIOR APPLICATION

This application is a National Stage Patent Application of PCT International Patent Application No. PCT/JP2016/053585 (filed on Feb. 5, 2016) under 35 U.S.C. § 371, which is hereby incorporated by reference in its entirety.

TECHNICAL FIELD

The present invention relates to a straddle vehicle such as a motorcycle.

BACKGROUND ART

In recent years, in a straddle vehicle such as a motorcycle, a structure has been known in which a saddle bag is arranged on a side of a vehicle and a lid portion on an outer side in a vehicle width direction is opened to the outer side in the vehicle width direction with respect to a case portion on an inner side of the vehicle to take in and take out articles. For example, Patent Literature 1 discloses a structure where, in the case of providing an anti-theft device, an intermediate member is attached above an inner portion of the case portion, a tray member is pivotably attached to the intermediate member, and a lock unit for locking the lid portion to the case portion is arranged on the intermediate member, and further the anti-theft device is arranged on the tray member.

PRIOR ART LITERATURE

Patent Literature

[Patent Literature 1]: JPA 2012-30612

SUMMARY OF THE INVENTION

Problem that the Invention is to Solve

However, in a structure disclosed in Patent Literature 1, the intermediate member and the tray member which is disposed below the intermediate member are provided in a storage space of the saddle bag, and thus not only the structure is complicated, but the storage space for articles is narrowed. Further, since the tray member is provided so as to be pivotable, when an electrical component is provided in the tray member, it is necessary to lengthen the wire harness in consideration of a rotational movement of the tray member. Also, when electrical components including an antenna for communication are arranged in the tray member, a structure which protects the electrical components from rainwater and improves radio wave reception is desired.

The invention provides a straddle vehicle where it is possible to increase the volume of a storage space of an article storage portion while preventing an increase in the number of parts of the article storage portion in which a lock unit and an antenna unit are accommodated and it is possible to improve a protection function for electrical components including an antenna against rainwater.

Means for Solving the Problem

The invention provides the following aspects.
According to a first aspect, a straddle vehicle includes:
a body frame,
an article storage portion including: a case portion which is supported by the body frame and opens in a vehicle width direction; and a lid portion attached to the case portion so as to be openable and closable, and having a storage space therein,
a lock unit for locking the lid portion to the case portion, and
an antenna unit for receiving radio waves, wherein
a tray member is provided in an upper portion of the case portion in the storage space of the article storage portion, and
the lock unit and the antenna unit are accommodated in the tray member.

According to a second aspect, in the first aspect,
the tray member is provided with a recess portion which is recessed downward, and
the lock unit and the antenna unit are arranged in the recess portion.

According to a third aspect, in the first aspect or the second aspect,
the antenna unit is supported by a stay member which is formed of metal and supports the lock unit.

According to a fourth aspect, in any one of the first aspect to the third aspect,
the case portion includes a first inner wall member and a second inner wall member, and
a mating surface where the first inner wall member and the second inner wall member are engaged is covered by a storage portion top cover member on an upper side.

According to a fifth aspect, in the fourth aspect,
in a state where the lid portion is closed, a drainage path is formed in a gap provided among the lid portion, the storage portion top cover member, and the case portion, and
the drainage path extends to an outer side of the tray member in the vehicle width direction.

Advantage of the Invention

According to the first aspect, since, in the storage space of the article storage portion, the tray member is provided in the upper portion of the case portion, and the lock unit and the antenna unit are accommodated in the tray member, a plurality of parts can be collected in one space. Therefore, it is not necessary to provide an intermediate member in the article storage portion and to provide the tray member below the intermediate member as in the related art, and thus the structure can also be simplified. As a result, the number of parts in the article storage portion can be reduced and the capacity of the storage space can be increased. Furthermore, it is possible to protect the antenna unit from rainwater and receive radio waves satisfactorily.

According to the second aspect, since the tray member is provided with the recess portion which is recessed downward, and the lock unit and the antenna unit are arranged in the recess portion of the tray member, a structure in which the peripheral portion of the recess portion is raised upward can be obtained. Therefore, since the occupancy volume of the tray member with respect to the storage space can be reduced by the protuberance, the storage space for accommodating articles can be increased.

According to the third aspect, since the stay member formed of metal supports the antenna unit, the antenna unit can be grounded to the stay member. Therefore, it is possible to eliminate noise flowing to the antenna unit without separately providing a grounding wire. Therefore, it is possible to receive radio waves satisfactorily.

According to the fourth aspect, since the case member includes the first inner wall member and the second inner wall member, and the mating surface where the first inner wall member and the second inner wall member are engaged is covered by the storage portion top cover member on the upper side, it is possible to prevent rainwater or the like from entering the tray member provided with the antenna unit. Therefore, it is possible to prevent the antenna unit from getting wet by water and it is possible to prevent noise from occurring in the antenna unit. Thus, it is possible to receive radio waves satisfactorily.

According to the fifth aspect, since, in a state where the lid portion is closed, the drainage path is formed in the gap among the lid portion, the storage portion top cover member, and the case portion, and the drainage path extends to the outer side of the tray member in the vehicle width direction, it is possible to prevent rainwater or the like from entering the tray member provided with the antenna unit. Therefore, it is possible to prevent the antenna unit from getting wet and it is possible to prevent noise from occurring in the antenna unit. Thus, it is possible to receive radio waves satisfactorily.

BRIEF DESCRIPTION OF DRAWINGS

FIG. 12 is a perspective view of the tray member on the right side in which a lock unit and an antenna unit are accommodated.

MODE FOR CARRYING OUT THE INVENTION

Figure 1:
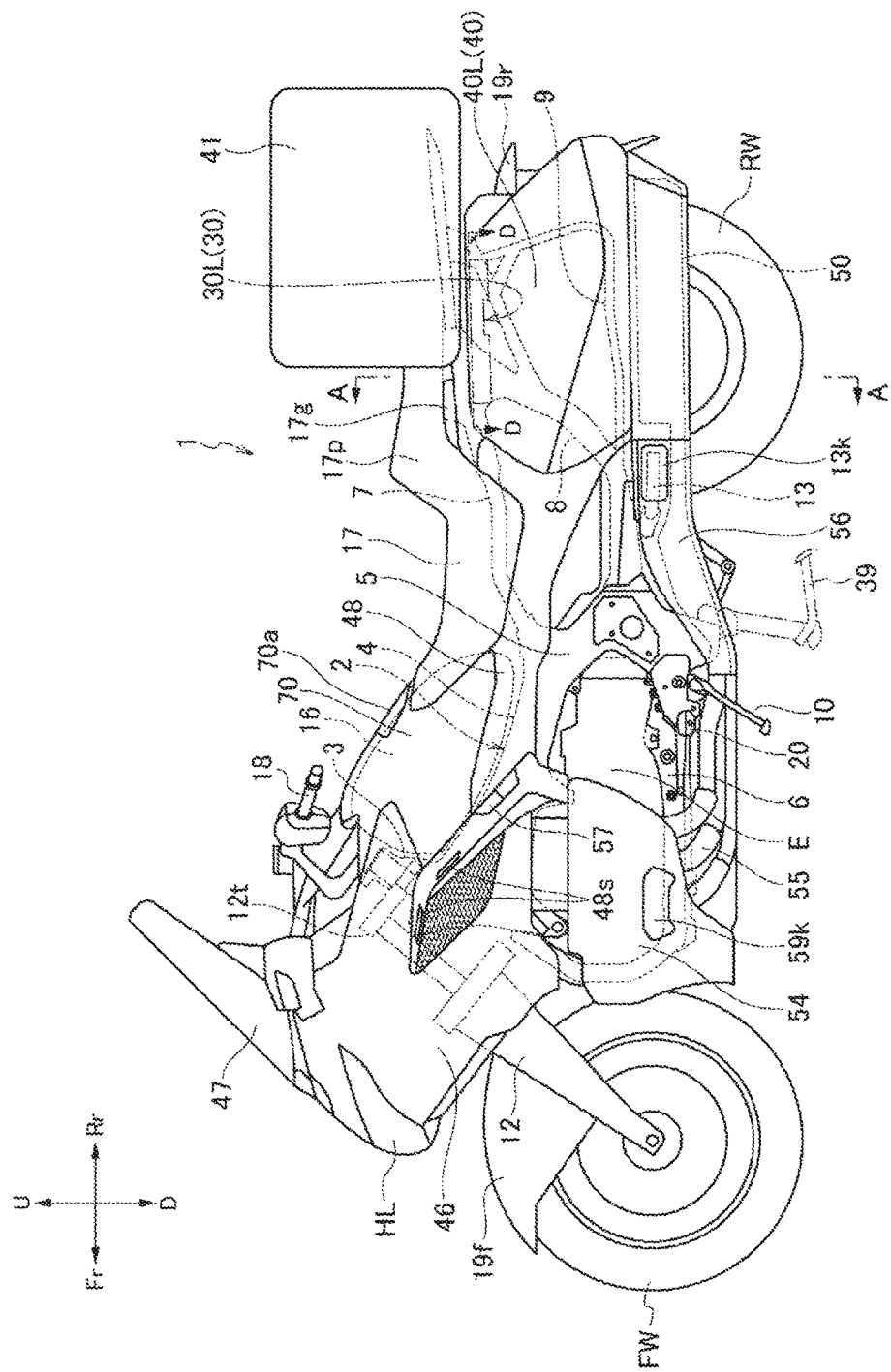
FIG. 1 is a left side view of a motorcycle which is an embodiment of a straddle vehicle according to the invention.

Hereinafter, a motorcycle which is an embodiment of a straddle vehicle of the invention will be described with reference to FIGS. 1 to 15. In the following description, the drawings shall be viewed in a direction of reference signs and front and rear, left and right, and up and down are described in accordance with a direction viewed from a rider. Further, in the drawings, the front of the vehicle is indicated by Fr, the rear is Rr, the left is L, the right is R, the upper is U. and the lower is D.

As illustrated in FIG. 1, a body frame 2 as a skeleton portion in a motorcycle 1 includes a pair of right and left main frames 4 extending rearward and downward from a head pipe 3, a pair of pivot frames 5 extending downward from the main frame 4, a pair of lower frames 6 which extends downward from the head pipe 3 and extends rearward, and further, is connected to the lower portion of the pivot frame 5, a pair of seat frames 7 which extends obliquely upper-rearward from the pivot frame 5, a pair of rear lower frames 8 for supporting the seat frame 7 from the lower side, and a bag frame 9 for supporting a saddle bag 40 and the like which will be described below on the rear side of the rear lower frame 8.

The head pipe 3 is attached to a top bridge 12t of a front fork 12 on which a front wheel FW is steerably mounted and a steering handle 18 is mounted on the top bridge 12t. In the body frame 2, a side stand 10 for supporting the vehicle body at the time of parking a vehicle is provided only on the left side of the lower portion of the body frame 2 at a substantially center portion in a front-rear direction of the vehicle and a main stand 39 is installed further on the rear side than the side stand 10. Also, directly in front of the side stand 10, a main step 20 on which a driver's foot rests is installed so as to protrude to both the right and left sides.

Figure 2:
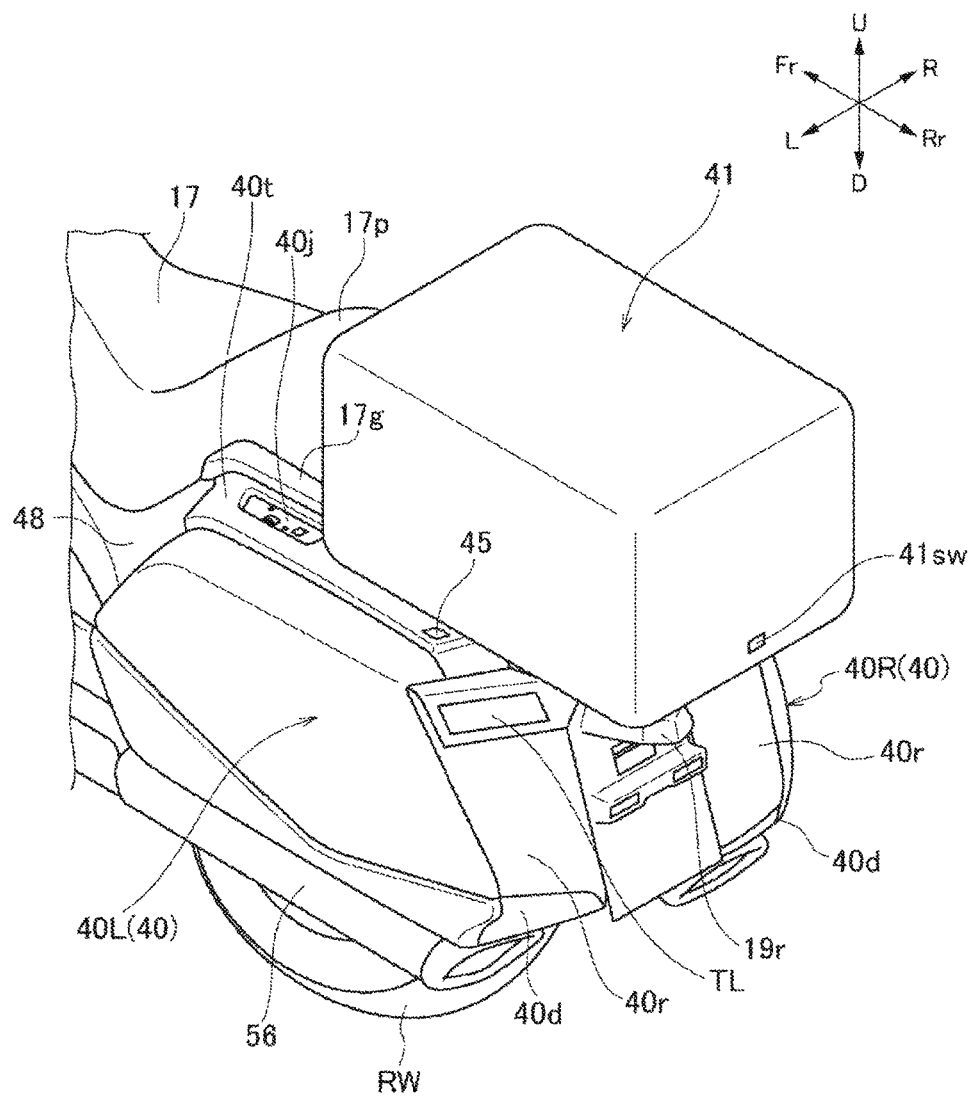
FIG. 2 is a perspective view of a rear portion of the motorcycle illustrated in FIG. 1 as viewed from the left rear side.

A fuel tank 16 is arranged between the main frames 4. Further, on the rear upper side of the fuel tank 16, a riding seat 17 on which a driver sits and a passenger seat 17p on which an additional rider sits are supported by the seat frame 7 so as to have steps in the front-rear direction. Also, as illustrated in FIG. 2, a trunk box 41 is provided behind the passenger seat 17p. Further, in the trunk box 41, a trunk box opening/closing switch 41sw is provided on the rear side.

An engine E is mounted in a space surrounded by the main frame 4, the pivot frame 5, and the lower frame 6. An exhaust pipe 55 extending obliquely rear-downward from the engine E further extends backward and is connected to a muffler 50. Further, a rear wheel RW is appropriately supported by the body frame 2 via a swing arm, a cushion unit, and the like (not illustrated). Saddle bags 40 (40L on the left side and 40R on the right side) as an article storage portion are provided on a lower side of rear grips 17g which are held by an additional rider on the right and left sides of the rear wheel RW and the mufflers 50 are provided on the lower side of the saddle bag 40 so as to pinch the rear wheel RW.

The outer surface of a vehicle is appropriately covered by a cover member. A headlight HL is provided at the center of the front portion of the vehicle and a front cowl 46 is provided so as to cover the upper, lower, left, and right sides of the headlight HL and a front screen 47 is provided above the front cowl 46.

A side cover 48 having a slit hole 48s in front of the leg of a driver is provided behind the front cowl 46 so as to cover the lower side of the fuel tank 16 and the lower side of the riding seat 17 and a top cover 70 is provided so as to cover the fuel tank 16. Further, a head cover 54, and the like for covering the side surface of the engine E and the like are provided below the front cowl 46.

Figure 3:
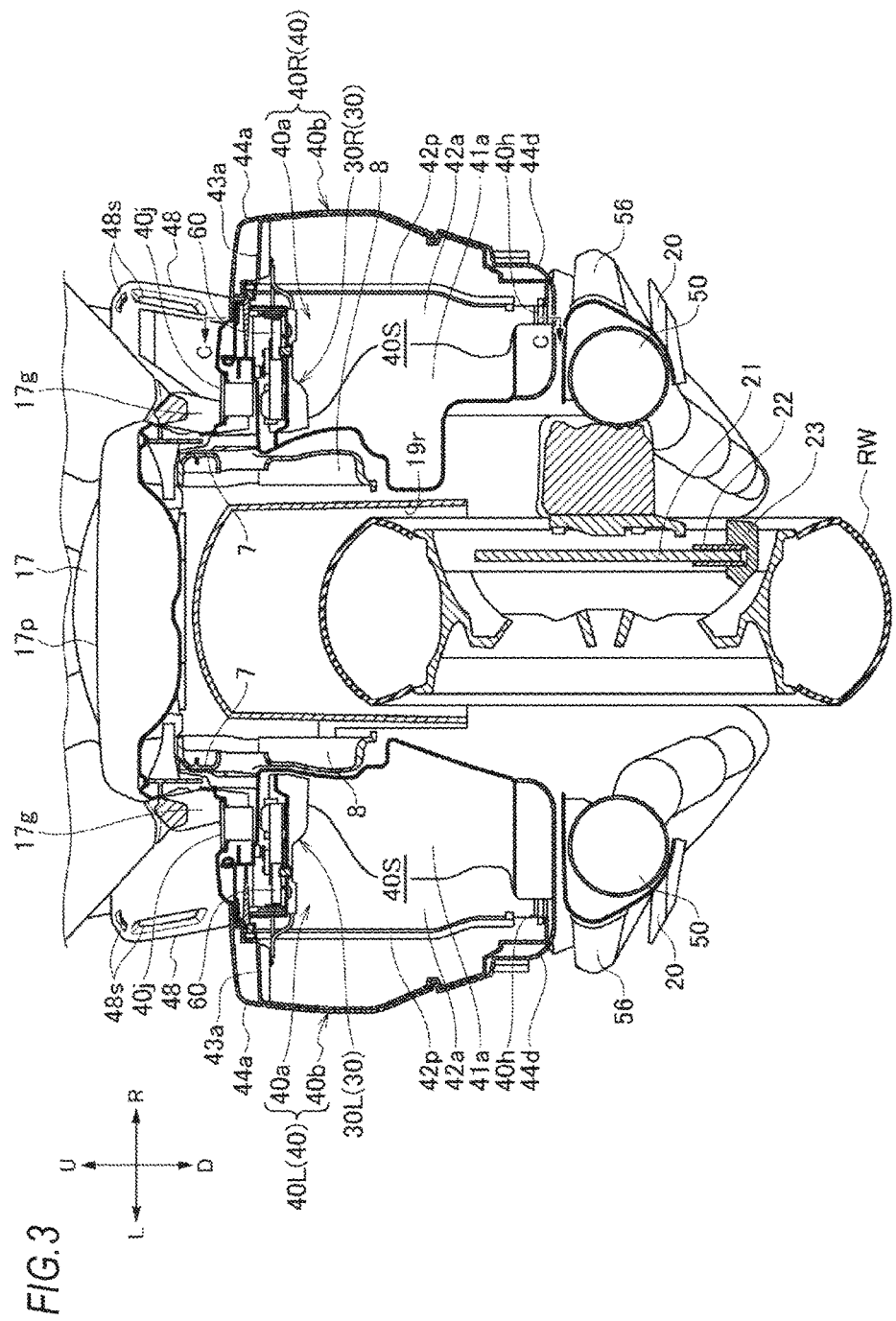
FIG. 3 is a cross-sectional view taken along a line A-A illustrated in FIG. 1 and is a rear view thereof.
Figure 4:
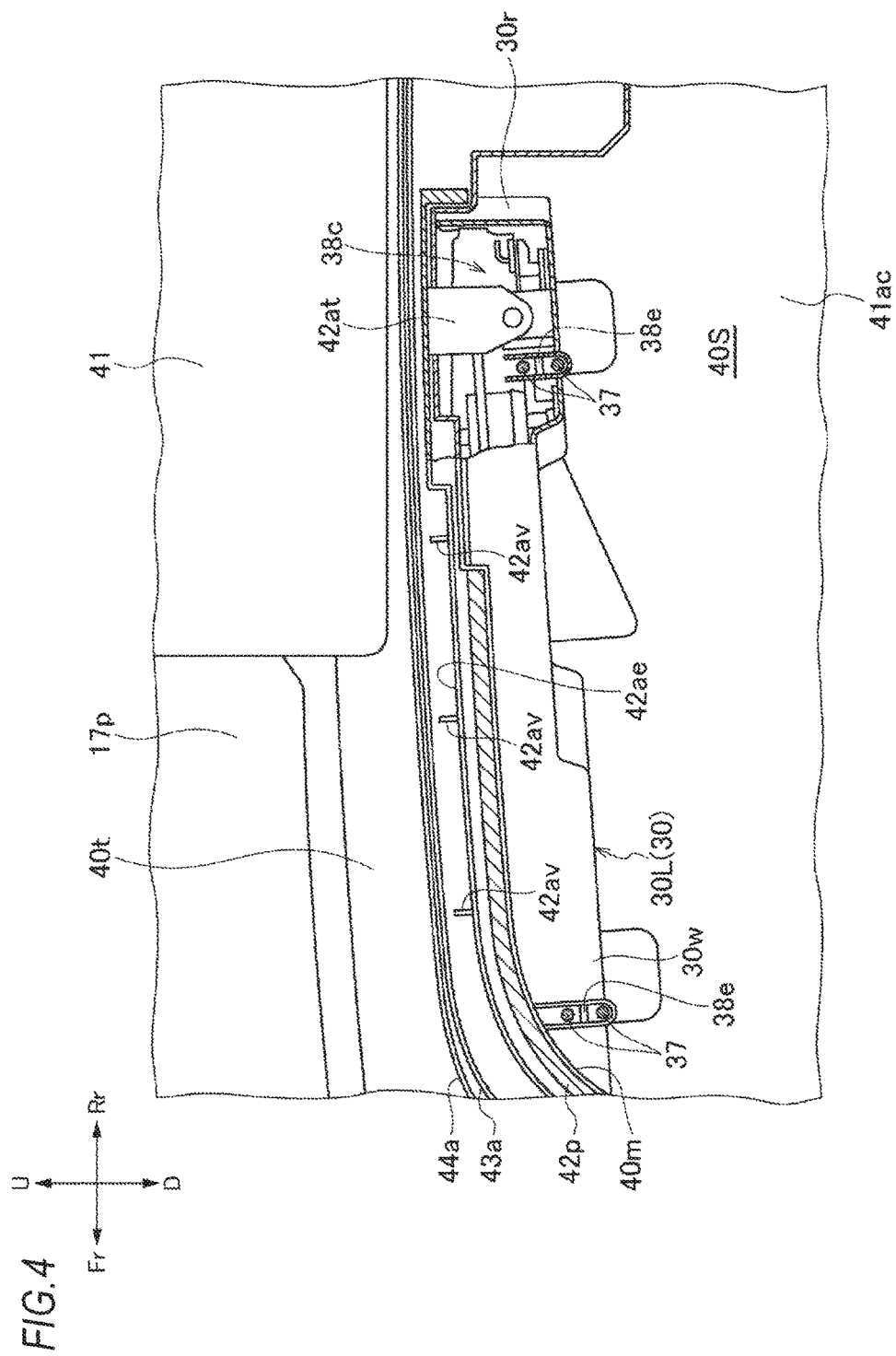
FIG. 4 is a cross-sectional view taken along a line B-B illustrated in FIG. 8 and is a left side view thereof.

A rear portion of the exhaust pipe 55 and the muffler 50 are covered by an exhaust pipe cover 56 and the exhaust pipe cover 56 is provided with a guard body cover 13k covering a guard body 13 protruding from an opening portion. Further, the front wheel FW is covered by a front fender 19f and the rear wheel RW is covered by a rear fender 19r. In FIGS. 1 to 3, the reference numeral 57 denotes a parking lever, the reference numeral 70a denotes a fuel lid, the reference letters TL denotes a tail light unit, the reference numeral 21 denotes a brake disc, the reference numeral 22 denotes a brake pad, and the reference numeral 23 denotes a brake caliper.

Hereinafter, the saddle bag 40 and the internal structure thereof will be described. In the saddle bag 40 that is, a saddle bag 40L and a saddle bag 40R are arranged symmetrical with a vehicle body interposed therebetween. Thus, the structure of the saddle bag 40L attached to the left side of the vehicle will be mainly described with reference to FIGS. 3 to 10 and, in a case of the structure of the saddle bag 40R attached to the right side of the vehicle, portions different from those of the left side will be described with reference to FIGS. 11 to 15. Regarding a tray member 30 and an antenna unit 60 provided inside the saddle bag 40, those provided inside the saddle bag 40L are respectively illustrated as a tray member 30L and the antenna unit 60L and those provided inside the saddle bag 40R are respectively illustrated as a tray member 30R and an antenna unit 60R.

Figure 9:
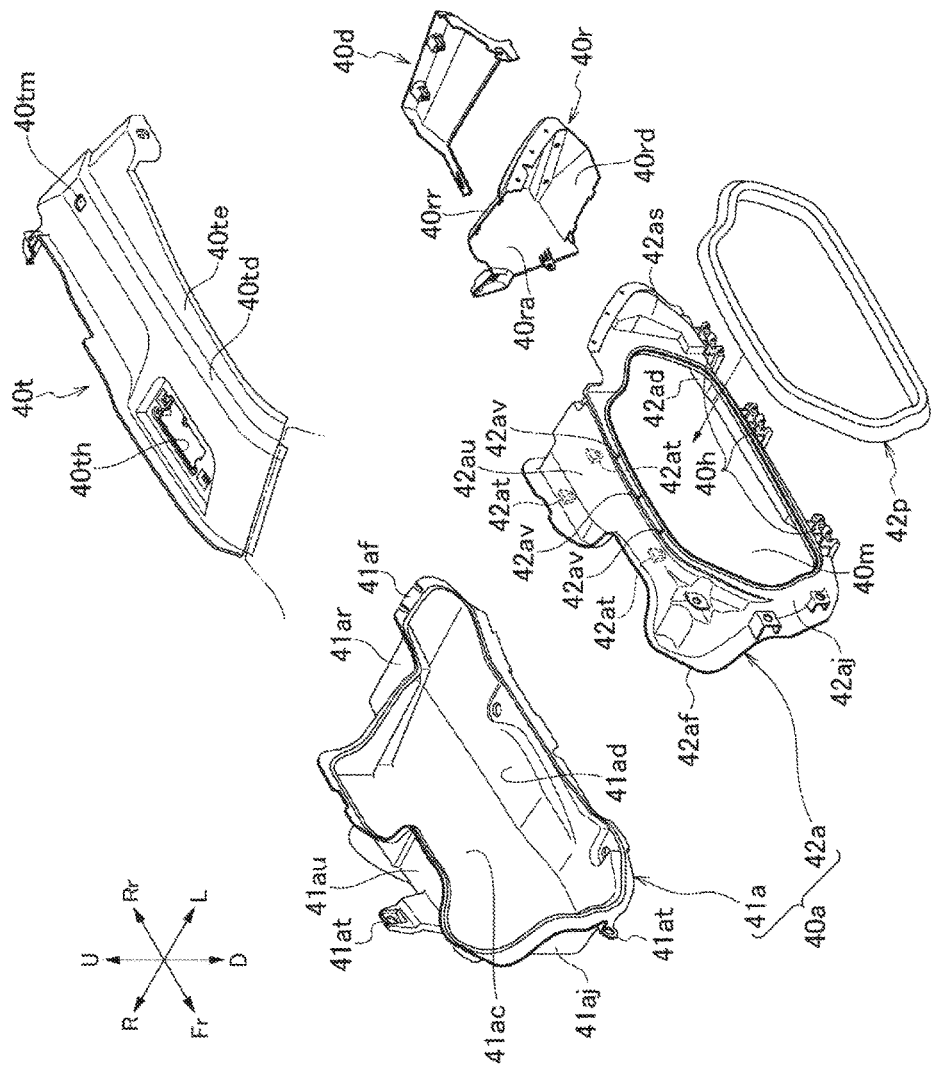
FIG. 9 is an exploded perspective view of a case portion in an article storage portion on the left side.
Figure 10:
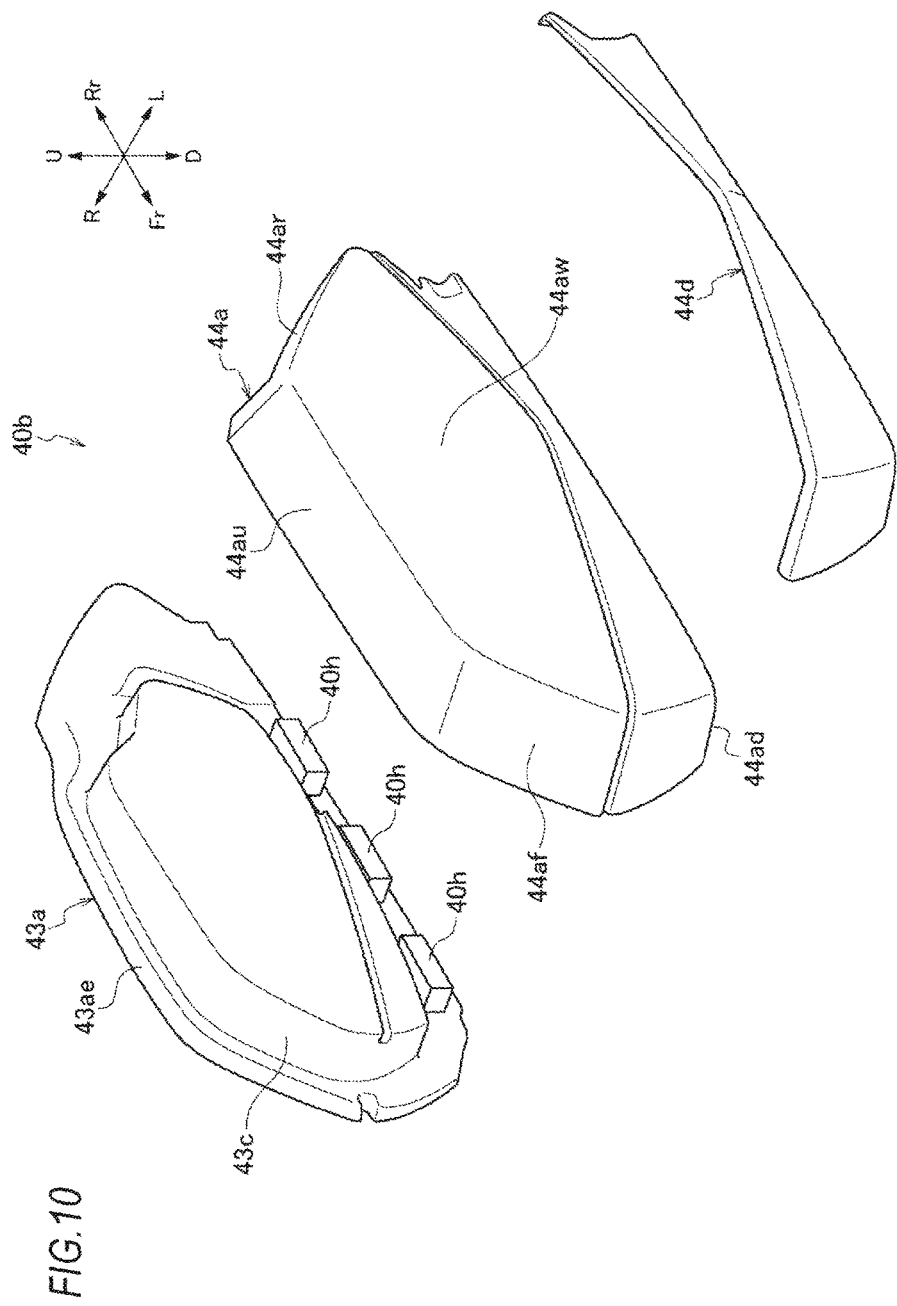
FIG. 10 is an exploded perspective view of a lid portion in the article storage portion on the left side.

As illustrated in FIGS. 3, 9, and 10, in the saddle bag 40L, a storage space 40S is formed by a case portion 40a which is fixed to the vehicle body and located on a vehicle width direction inner side (vehicle body side) and a lid portion 40b which opens and closes with respect to the case portion 40a and is located on a vehicle width direction outer side (left side). More specifically, the case portion 40a includes an opening portion 40m which opens outward (left side) in the vehicle width direction and the lid portion 40b is pivotally attached to the case portion 40a so as to open and close the opening portion 40m via a hinge portion 40h provided at the lower portion of the case portion 40a.

As illustrated in FIGS. 3 to 6, a storage space 40S of the saddle bag 40 L is provided with the tray member 30L at the top of the case portion 40a. The tray member 30L is fixed in a state where the tray member 30L is suspended from a plurality of tray attaching portions 42 at provided on the inner upper surface. A lock unit 38 for locking the lid portion 40b with respect to the case portion 40a, an antenna unit 60L for receiving radio waves for GPS, and other electrical components 61 and 62, and the like are accommodated in the upper portion of the tray member 30L.

Figure 5:
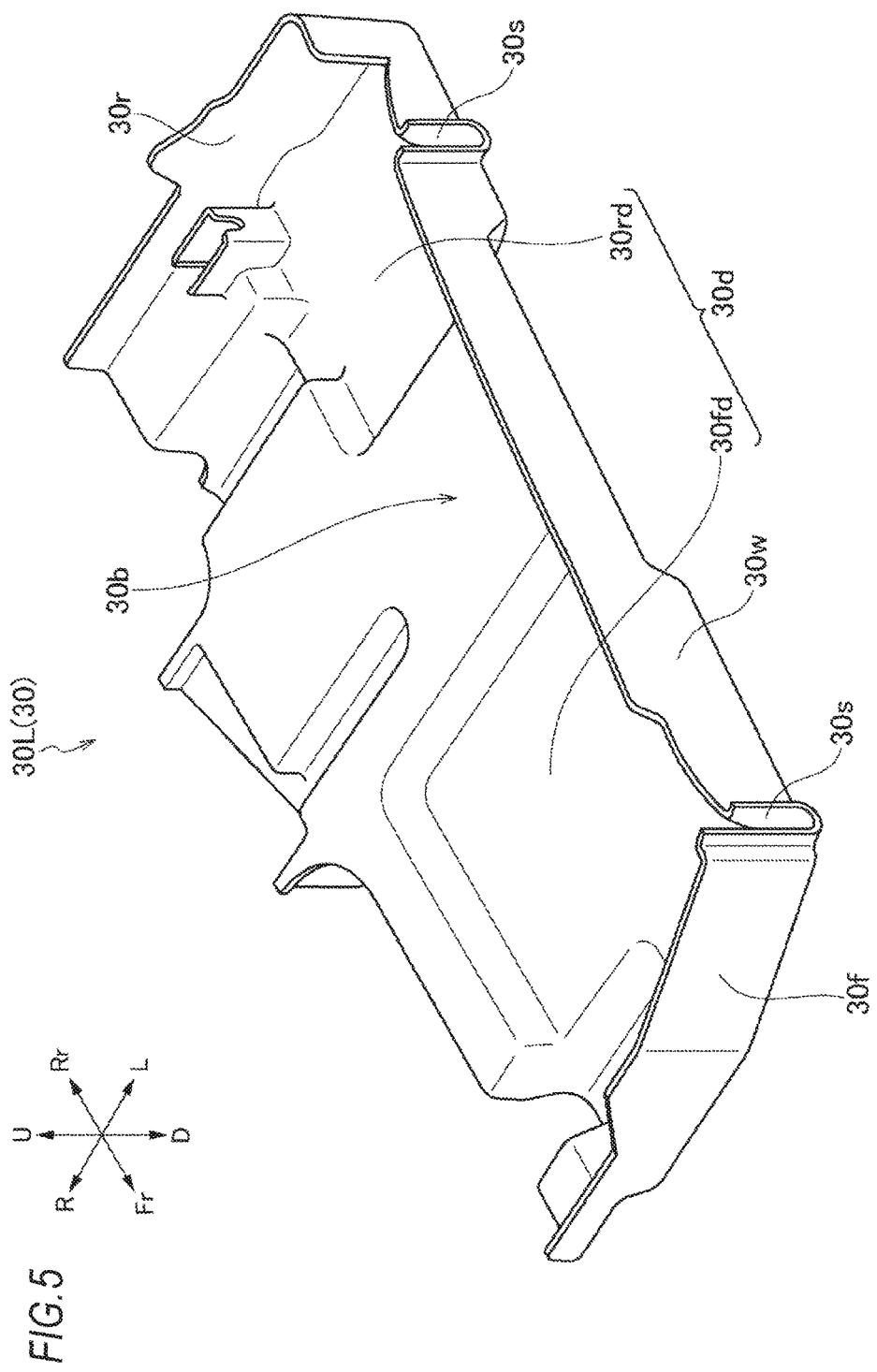
FIG. 5 is an enlarged perspective view of a tray member on a left side.

As illustrated in FIG. 5, the tray member 30L has a structure that surrounds accommodating components with a tray bottom portion 30b having a rectangular shape, a tray front wall portion 30f rising from the front portion of the tray bottom portion 30b, a tray rear wall portion 30r rising from the rear portion of the tray bottom portion 30b, and a tray transverse wall portion 30w rising from the left end portion of the tray bottom portion 30b. The tray bottom portion 30b is provided with a recess portion 30d which is recessed downward. The recess portion 30d is constituted of a front-side recess portion 30fd on the front side and a rear-side recess portion 30rd on the rear side and, in the tray transverse wall portion 30w, slit-shaped openings 30s are respectively provided at positions corresponding to the front-side recess portion 30fd and the rear-side recess portion 30rd.

Figure 6:
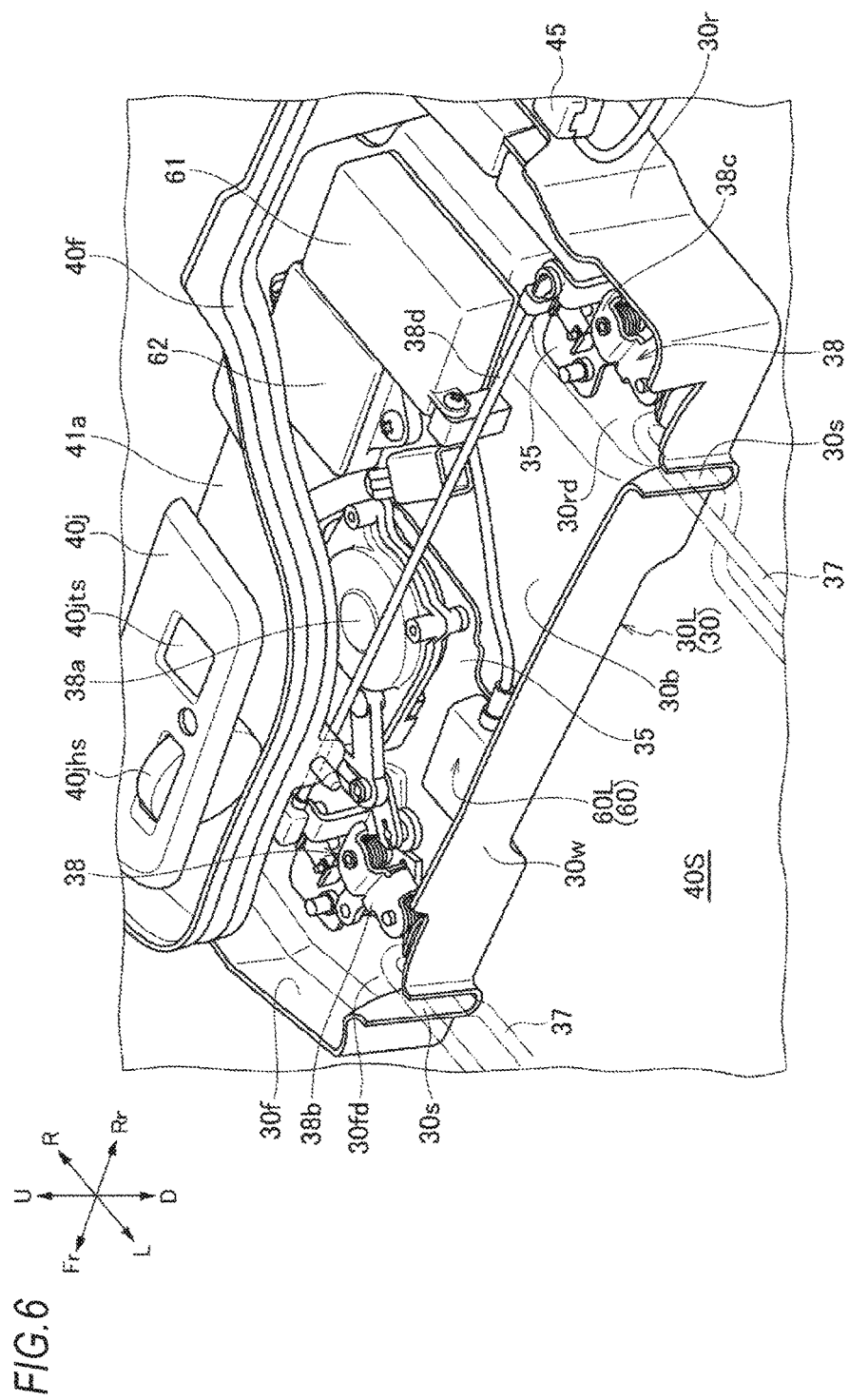
FIG. 6 is a perspective view of the tray member on the left side in which a lock unit and an antenna unit are accommodated.

As illustrated in FIG. 6, the lock unit 38 includes a motor 38a attached to a stay member 35 formed of metal, a first driving mechanism 38b connected to the motor 38a and swinging horizontally, and a second driving mechanism 38c connected to the first driving mechanism 38b through a connecting rod 38d and swinging horizontally so as to interlock with the first driving mechanism 38b. The motor 38a and the first driving mechanism 38b of the lock unit 38 are arranged in the front-side recess portion 30fd and the second driving mechanism 38c is arranged in the rear-side recess portion 30rd.

In addition, the first and second driving mechanisms 38b and 38c are arranged so that locking portions 38e (see FIG. 4) correspond to the slit-shaped openings 30s and, in a state where the lid portion 40b is closed, two front and rear engaging metal fittings 37 provided in the lid portion 40b are locked. The lock unit 38 is structured such that, with interlocking with an opening/closing switch 45 for controlling the motor 38a, the locking portion 38e releases the locking of the engaging metal fittings 37, in such a manner that the lid portion 40b is opened.

The antenna unit 60L is fixedly supported via a bolt 88 to a stay member 35 which is formed of metal and supports the lock unit 38 and is disposed in the front-side recess portion 30fd together with the motor 38a and the first driving mechanism 38b. Therefore, the antenna unit 60L is in a state where the antenna unit 60L is always grounded to the stay member 35.

Here, with reference to FIG. 9, the case portion 40a of the saddle bag 40L will be described.

The case portion 40a mainly includes a first inner wall member 41a, a second inner wall member 42a, a case rear cover member 40r, a case rear bottom cover member 40d, and a storage portion top cover member 40t.

The first inner wall member 41a includes a case vertical wall portion 41ac which extends along a substantially vertical direction on an inner side (vehicle body side) in the vehicle width direction, a case lower wall portion 41ad which extends to the outer side (left side) in the vehicle width direction substantially horizontally at the bottom of the case vertical wall portion 41ac, a case upper wall portion 41au which extends to the outer side (left side) in the vehicle width direction substantially horizontally at the top of the case vertical wall portion 41ac, a case front wall portion 41aj which extends to the outer side (left side) in the vehicle width direction at the front portion of the case vertical wall portion 41ac, and a case rear wall portion 41ar which extends to the outer side (left side) in the vehicle width direction at the rear portion of the case vertical wall portion 41ac and the first inner wall member 41a has a bottomed tubular structure which opens to the outer side (left side) in the vehicle width direction. An opening edge of the first inner wall member 41a forms a first-inner-wall-member-side mating portion 41af which is in contact with the second inner wall member 42a. The first inner wall member 41a is appropriately fixed to the body frame 2 via, for example, a mounting portion 41 at extending from the case upper wall portion 41au.

The second inner wall member 42a is an annular member which is attached to the outer side (left side) of the first inner wall member 41a in the vehicle width direction and constitutes an opening portion 40m of the case portion 40a. Specifically, the second inner wall member 42a includes a second lower wall portion 42ad connected to the left side of the case lower wall portion 41ad of the first inner wall member 41a, the second upper wall portion 42au connected to the left side of the case upper wall portion 41au, the second front wall portion 42aj connected to the left side of the case front wall portion 41aj, and the second side wall portion 42as connected to the left side of the case rear wall portion 41ar and the second inner wall member 42a has a tubular structure which opens to both sides of the vehicle. An opening edge which opens to the outer side (left side) in the vehicle width direction and is surrounded by the second lower wall portion 42ad, the second upper wall portion 42au, the second front wall portion 42aj, and second side wall portion 42as forms an opening portion 40m and an opening edge which opens to the inner side (vehicle body side) in the vehicle width direction forms a second-inner-wall-member-side mating portion 42*af* which is in contact with the first inner wall member 41*a*. A joining portion between the first-inner-wall-member-side mating portion 41*af* and the second-inner-wall-member-side mating portion 42*af* constitutes a mating surface 40*f*.

A sealing member 42*p* is attached to a second inner wall opening edge 42*ae* constituting the opening portion 40*m* of the case portion 40*a*. Therefore, it is possible to ensure sealing properties of the case portion 40*a* and the lid portion 40*b* in a locked state. Further, for example, three ribs 42*av* which protrude upward at appropriate intervals in the front-rear direction and extend in the vehicle width direction are provided on the upper portion of the second inner wall opening edge 42*ae*. The ribs 42*av* are provided to form a drainage path 40*sd* described below. The second lower wall portion 42*ad* is provided with a part of the hinge portion 40*h* which enables an opening/closing operation of the lid portion 40*b*.

The case rear cover member 40*r* is provided further on the rear side of the case rear wall portion 41*ar*. The case rear cover member 40*r* includes a rear wall portion 40*rr* which covers the rear side of the case rear wall portion 41*ar*, a rear inner wall portion 40*ra* which covers the rear side and the vehicle-width-direction inner side (vehicle body side) of the case vertical wall portion 41*ac*, and the rear bottom wall portion 40*rd* which covers the rear lower side of the case lower wall portion 41*ad*. The case rear bottom cover member 40*d* which covers the lower side of the rear bottom wall portion 40*rd* is provided further on the lower side of the rear bottom wall portion 40*rd*.

The storage portion top cover member 40*t* which covers the case upper wall portion 41*au* and the second upper wall portion 42*au* is provided on the upper side of the both members of the case upper wall portion 41*au* and the second upper wall portion 42*au*. In the storage portion top cover member 40*t*, an operating portion opening 40*th* for mounting a switch case 40*jc* of an operation portion 40*j* (see FIG. 2) is provided on the front side and a switch opening 40*tm* for attaching an opening/closing switch 45 (see FIG. 2) is provided on the rear side. A seat heater switch 40*jhs*, a call on/off switch 40*jts*, and the like are provided in the operation portion 40*j* (see FIG. 6) on the left side of the vehicle. In the operation portion 40*j* on the right side of the vehicle, audio operation switches such as music reproduction, track feeding, fast forward, returning, and the like and an audio sound source changeover switch (not illustrated) are provided.

Figure 7:
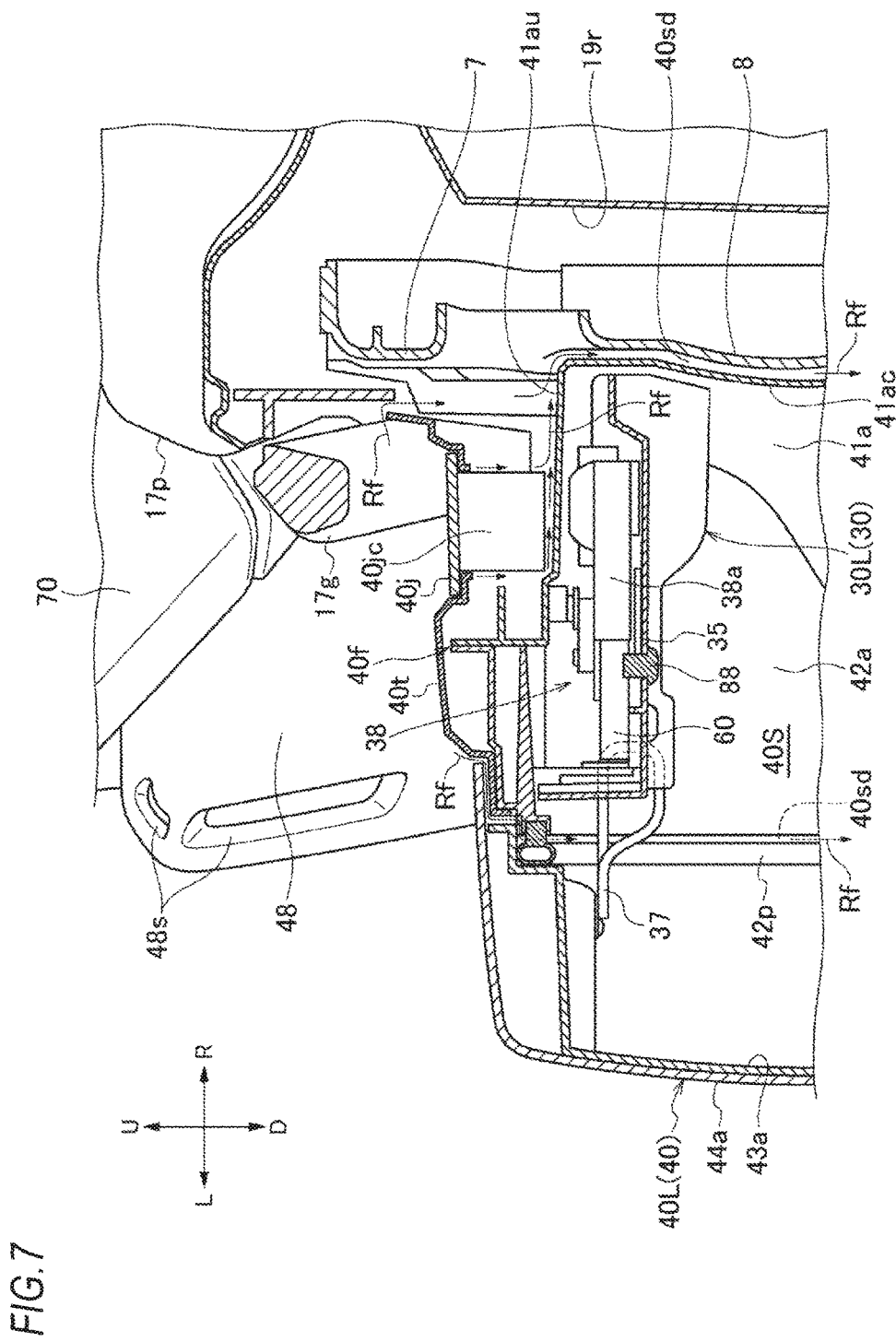
FIG. 7 is an enlarged view of FIG. 3.
Figure 8:
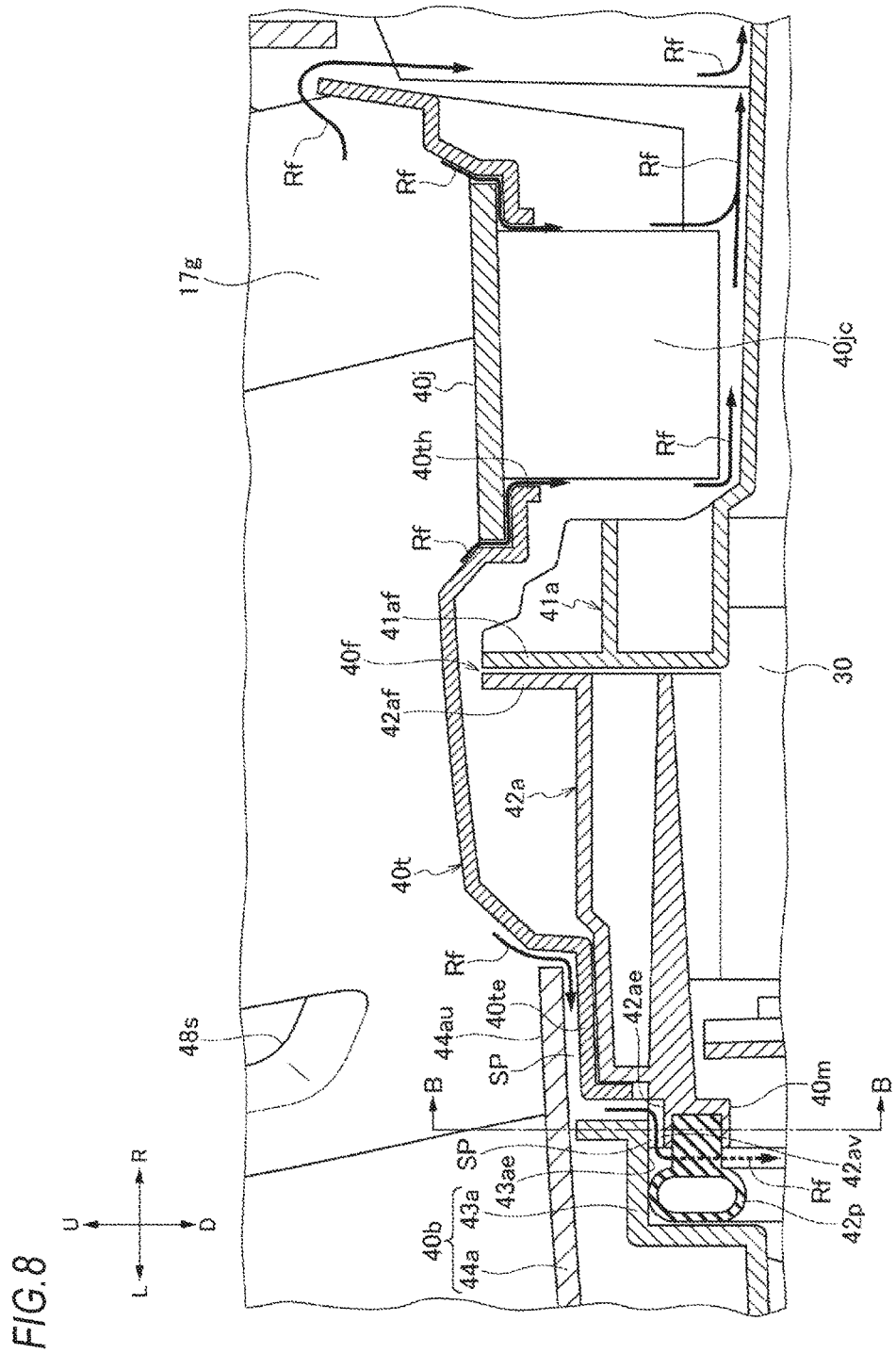
FIG. 8 is an enlarged view of FIG. 7.

As illustrated in FIGS. 7 and 8, in a state where the first inner wall member 41*a* and the second inner wall member 42*a* are joined, the storage portion top cover member 40*t* covers the mating surface 40*f* where the first-inner-wall-member-side mating portion 41*af* and the second-inner-wall-member-side mating portion 42*af* are engaged from above, and thus the storage portion top cover member 40*t* prevents the entry of rainwater (see FIG. 9).

A cover outer edge portion 40*te* on the outer side in the vehicle width direction of the storage portion top cover member 40*t* is constituted to be located lower than the other portions by providing a step portion 40*td*. In a state where the lid portion 40*b* is closed, an outer lid upper wall portion 44*au* of an outer lid member 44*a* covers the cover outer edge portion 40*te* via a predetermined gap Sp. The storage portion top cover member 40*t* is configured such that the front side of the storage portion top cover member 40*t* is connected to the rear end portion of the side cover 48 and the rear end portion of the side cover 48 protrudes to the outer side (left side) in the vehicle width direction, and thus the case front wall portion 41*aj* of the first inner wall member 41*a* and the second front wall portion 42*aj* of the second inner wall member 42*a* are covered.

Next, with reference to FIG. 10, the lid portion 40*b* of the saddle bag 40 will be described.

The lid portion 40*b* includes an inner lid member 43*a*, the outer lid member 44*a* which is attached so as to cover the outer side (left side) of the inner lid member 43*a* in the vehicle width direction, and an outer lid under cover member 44*d* which is attached so as to cover only the lower portion of the outer side (left side) of the outer lid member 44*a* in the vehicle width direction.

The inner lid member 43*a* includes an inner lid recess portion 43*c* recessed to the outer side (left side) in the vehicle width direction so as to form the storage space 40S. In the lower end portion of the inner lid member 43*a*, a part of the hinge portion 40*h* which is combined with a part of the hinge portion 40*h* provided on the case portion 40*a* side as described above to enable the opening and closing operation of the lid portion 40*b* is provided.

The outer lid member 44*a* includes an outer lid vertical wall portion 44*aw* which extends along the substantially vertical direction on the outer side (left side) in the vehicle width direction, an outer lid lower wall portion 44*ad* which extends substantially horizontally inward (vehicle body side) in the vehicle width direction at the lower portion of the outer lid vertical wall portion 44*aw*, the outer lid upper wall portion 44*au* which extends substantially horizontally inward (vehicle body side) in the vehicle width direction at the top of the outer lid vertical wall portion 44*aw*, an outer lid front wall portion 44*af* which extends to the inner side (vehicle body side) in the vehicle width direction at the front portion of the outer lid vertical wall portion 44 *aw*, and an outer lid rear wall portion 44*ar* which extends to the inner side (vehicle body side) in the vehicle width direction at the rear portion of the outer lid vertical wall portion 44*aw*. The outer lid member 44*a* has a bottomed tubular structure which opens to the inner side (vehicle body side) in the vehicle width direction.

As illustrated in FIGS. 7 and 8, in the case portion 40*a* and the lid portion 40*b* constituted as described above, when the lid portion 40*b* is closed, a gap SP is formed between the outer lid member 44*a* of the lid portion 40*b* and the cover outer edge portion 40*te* of the storage portion top cover member 40*t*, and further a gap SP extending along the sealing member 42*p* is also formed between the inner lid member 43*a* of the lid portion 40*b* and the second inner wall opening edge 42*ae* of the case portion 40*a* so as to be continuous with the gap SP. As described above, the gap SP is secured by the ribs 42*av* protruding from the upper portion of the second inner wall opening edge 42*ae*. That is, an inner lid edge 43*ae* of the inner lid member 43*a* abuts against the ribs 42*av* with respect to the second inner wall opening edge 42*ae* of the second inner wall member 42*a*, in such a manner that the gap SP is secured above the second inner wall opening edge 42*ae*. Due to the gap SP, a drainage path 40*sd* is formed so as to extend to the outer side (left side) in the vehicle width direction of the tray member 30L. Therefore, waste water Rf such as rainwater flowing into the gap SP from the upper surface of the cover outer edge portion 40*te* is guided to the outer side (left side) of the tray member 30L in the vehicle width direction via the drainage path 40*sd* and flows along the upper surface of the sealing member 42*p* in the vehicle longitudinal direction (direction perpendicular to the paper surface in FIG. 8), and then the waste water Rf is discharged downward (outside) of the saddle bag 40L along the sealing member 42*p*.

In addition to the drainage path 40sd which leads the waste water Rf to the outer side (left side) of the tray member 30L in the vehicle width direction, a drainage path 40sd is also provided on the inner side (vehicle body side) in the vehicle width direction. As illustrated in FIG. 7, the drainage path 40sd on the inner side (vehicle body side) in the vehicle width direction is formed to pass a portion between the case vertical wall portion 41ac of the case portion 40a and the seat frame 7 from a portion between the switch case 40jc and the case upper wall portion 41au of the first inner wall member 41a and a portion between the storage portion top cover member 40t and the seat frame 7. Therefore, the waste water Rf such as rainwater which is entered from a portion between the storage portion top cover member 40t and the operation portion 40j and a portion between the storage portion top cover member 40t and the seat frame 7 is guided to the inner side (right side) of the tray member 30L in the vehicle width direction via the drainage path 40sd and discharged downward (outside) of the saddle bag 40L.

As illustrated in FIGS. 7 and 8, both the drainage paths 40sd in the vehicle width lateral direction which are formed as described above guide the waste water Rf to both sides with the tray member 30L interposed therebetween, and thus the waste water Rf bypasses the tray member 30 and is discharged to the outside.

With reference to FIGS. 11 to 15, the tray member 30R on the right side of the vehicle and the peripheral structure thereof will be described. The same reference numerals and letters are given to the same constituent members as those of the structure on the left side of the vehicle and the description thereof will not be repeated as appropriate.

Figure 11:
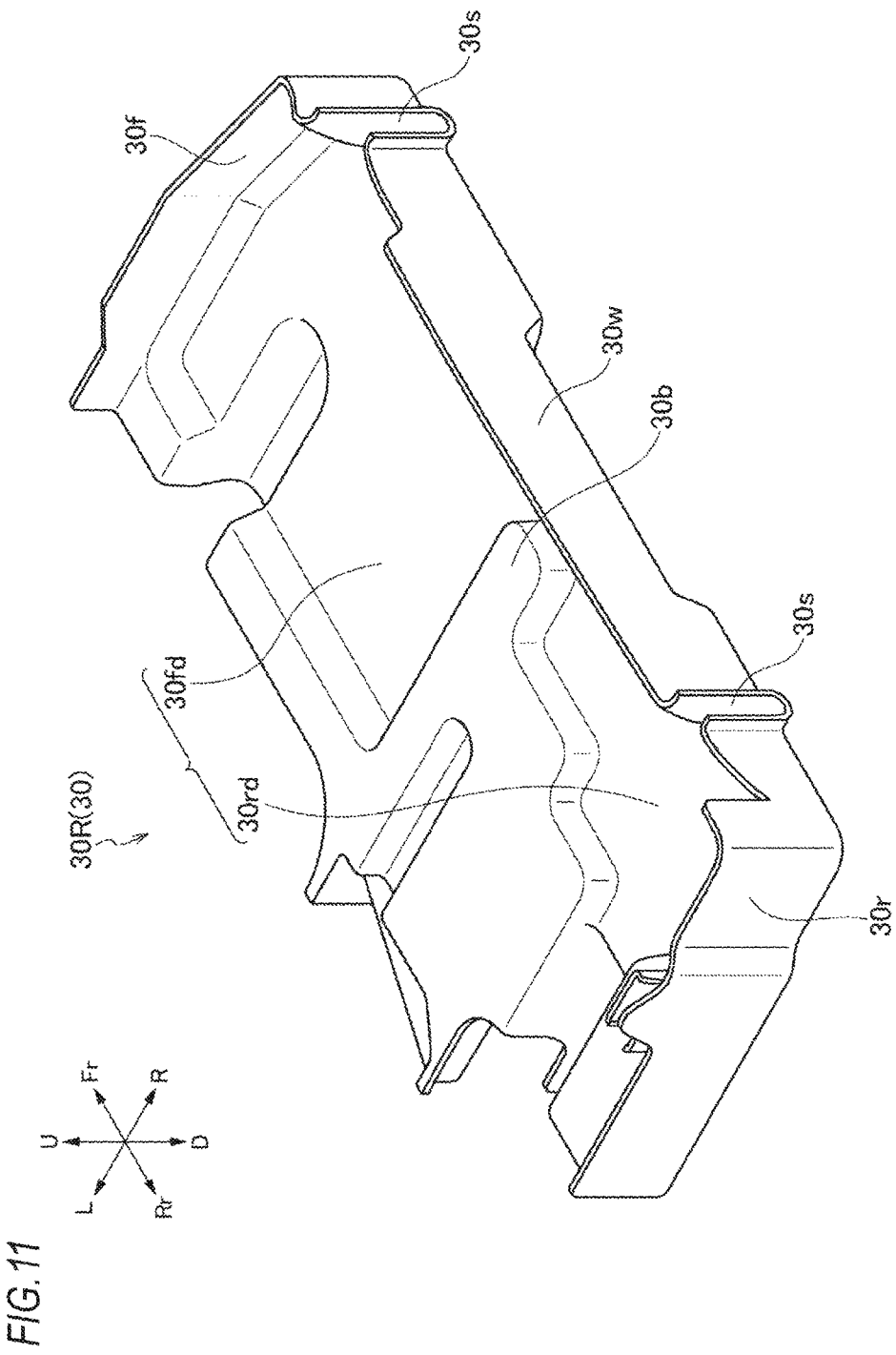
FIG. 11 is an enlarged perspective view of a tray member on a right side.
Figure 13:
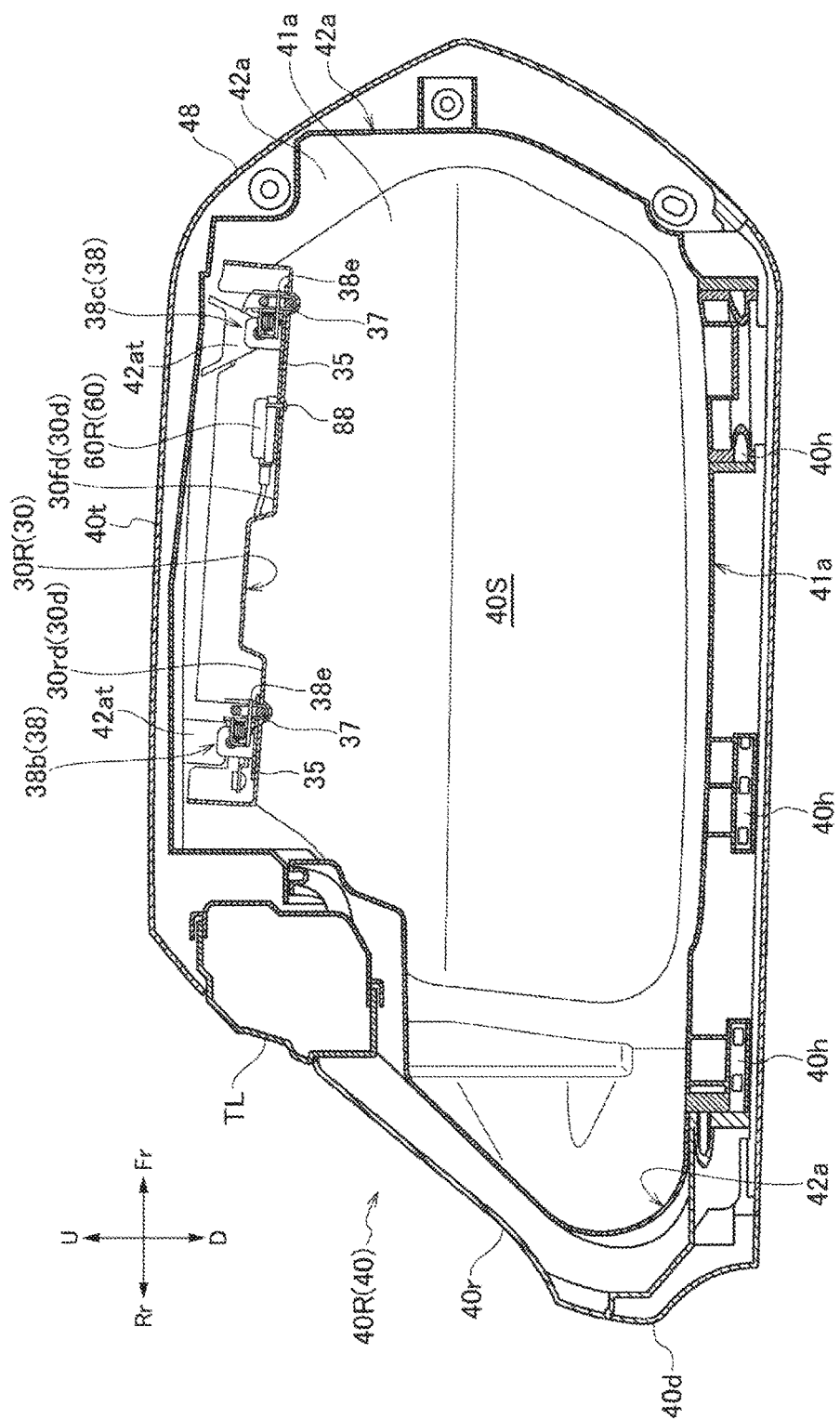
FIG. 13 is a cross-sectional view of an article storage portion on the right side and is a right side view taken along a line C-C illustrated in FIG. 3.
Figure 14:
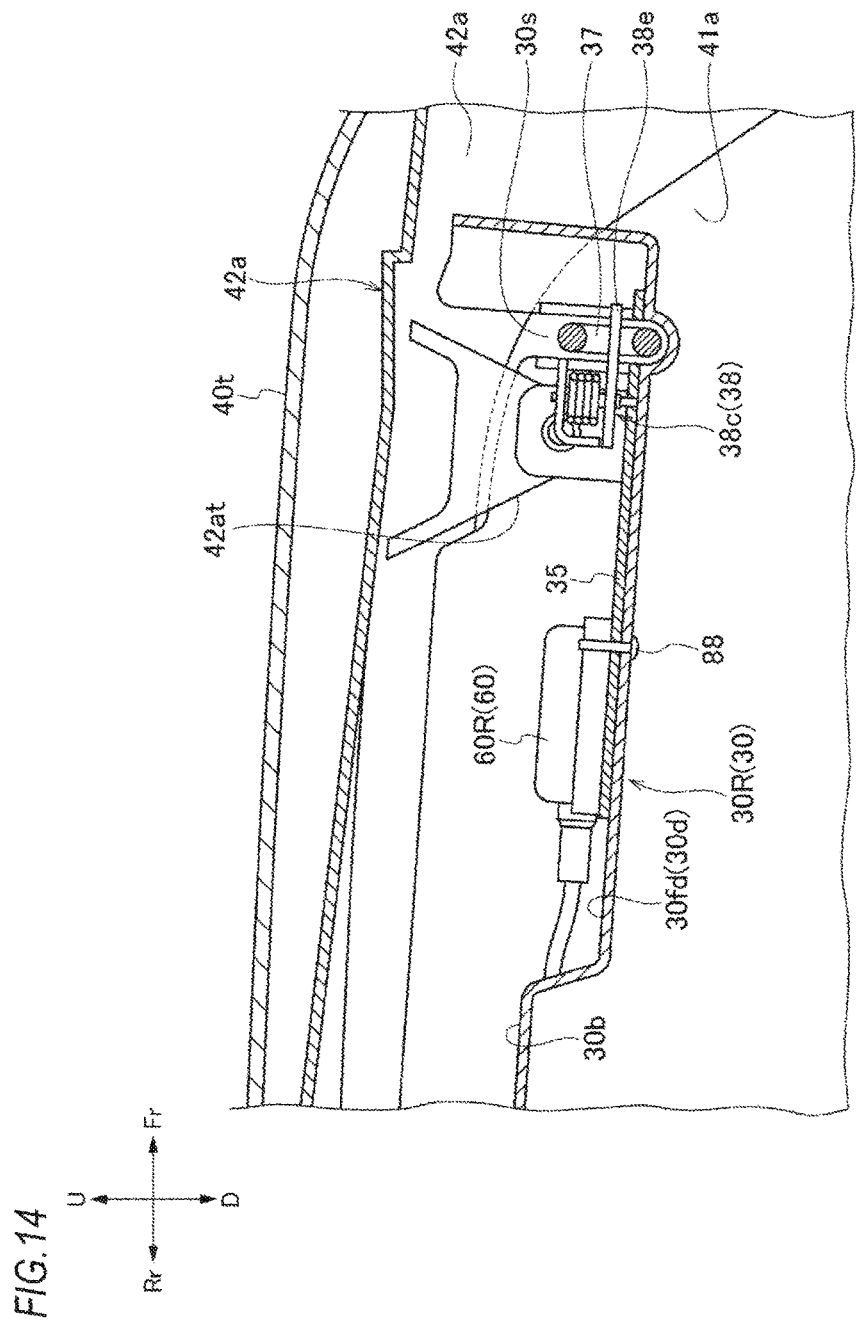
FIG. 14 is an enlarged view of a main portion in FIG. 13.
Figure 15:
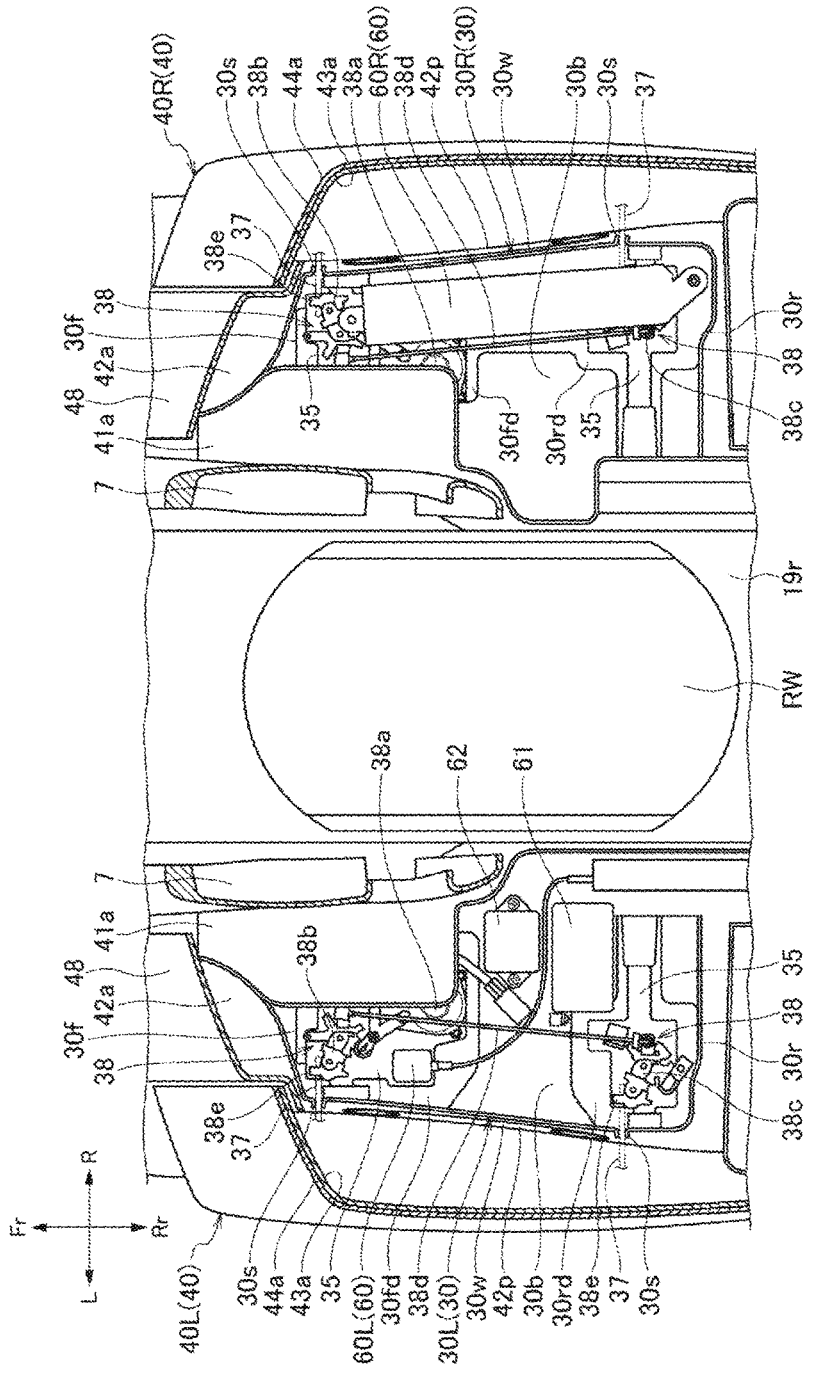
FIG. 15 is a cross-sectional view taken along a line D-D illustrated in FIG. 1 and is a top view thereof.

As illustrated in FIG. 11, similarly to the tray member 30L on the left side, the tray member 30R has a structure where storage parts are surrounded by the tray bottom portion 30b, the tray front wall portion 30f, the tray rear wall portion 30r, and the tray transverse wall portion 30w. However, the shape of the recess portion 30d is slightly different from that of the tray member 30L on the left side. That is, in the recess portion 30d of the tray member 30R, the front-side recess portion 30fd on the front side and the rear-side recess portion 30rd on the rear side have, for example, a continuous structure. This structure corresponds to an antenna unit 60R (60) provided along the tray transverse wall portion 30w as illustrated in FIGS. 12 to 15. A radio unit, for example, is arranged as the antenna unit 60R. Other structures such as the lock unit 38 and the like are configured similarly to those on the left side of the vehicle.

The embodiment of the invention is described above. However, the invention is not limited to the embodiment described above and can be appropriately modified.

In the embodiment described above, the shape of the recess portion 30d in the tray member 30 can be appropriately changed corresponding to the shapes of the antenna unit 60 and the lock unit 38, for example. Also, the structure of the lock unit 38 is not limited to the structure of the embodiment described above and can be appropriately changed. Further, the structure of the case portion 40a and the lid portion 40b is not limited to the illustrated shape at all.

In the above embodiment, a motorcycle is described. However, the invention can be applied to other tricycles and four-wheel straddle vehicles.

DESCRIPTION OF REFERENCE NUMERALS AND CHARACTERS

1: motorcycle (straddle vehicle)
2: body frame
30 (30L, 30R): tray member
30d: recess portion
35: stay member
38: lock unit
40 (40L, 40R): saddle bag (article storage portion)
40a: case portion
40b: lid portion
40f: mating surface
40h: hinge portion
40S: storage space
40sd: drainage path
40t: storage portion top cover member
41a: first inner wall member
42a: second inner wall member
60: antenna unit
E: engine
SP: gap

The invention claimed is:

1. A straddle vehicle comprising:
a body frame;
an article storage portion including: a case portion which is supported by the body frame and opens in a vehicle width direction; and a lid portion attached to the case portion so as to be openable and closable, and having a storage space therein;
a lock unit for locking the lid portion to the case portion; and
an antenna unit for receiving radio waves, wherein
a tray member is provided in an upper portion of the case portion in the storage space of the article storage portion,
the lock unit and the antenna unit are accommodated in the tray member, and
the antenna unit is supported by a stay member which is formed of metal and supports the lock unit.

2. The straddle vehicle according to claim 1, wherein the tray member is provided with a recess portion which is recessed downward, and
the lock unit and the antenna unit are arranged in the recess portion.

3. The straddle vehicle according to claim 1, wherein the case portion includes a first inner wall member and a second inner wall member, and
a mating surface where the first inner wall member and the second inner wall member are engaged is covered by a storage portion top cover member on an upper side.

4. The straddle vehicle according to claim 3, wherein in a state where the lid portion is formed in a gap provided among the lid portion, the storage portion top cover member, and the case portion, and
the drainage path extends to an outer side of the tray member in the vehicle width direction.

* * * * *